United States Patent
Ose et al.

(10) Patent No.: US 9,399,404 B2
(45) Date of Patent: Jul. 26, 2016

(54) CHARGING SYSTEM FOR ALL-SOLID-STATE BATTERY

(71) Applicant: TOYOTA JIDOSHA KABUSHIKI KAISHA, Toyota-shi, Aichi-ken (JP)

(72) Inventors: Norihiro Ose, Sunto-Gun (JP); Tomoharu Sasaoka, Hadano (JP); Hajime Hasegawa, Susono (JP); Kazuhito Kato, Sunto-Gun (JP); Kengo Haga, Susono (JP); Daichi Kosaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/534,723

(22) Filed: Nov. 6, 2014

(65) Prior Publication Data
US 2015/0134172 A1  May 14, 2015

(30) Foreign Application Priority Data

Nov. 8, 2013 (JP) ................................. 2013-232175

(51) Int. Cl.
| H01M 10/0565 | (2010.01) |
| B60L 11/18 | (2006.01) |
| H01M 10/04 | (2006.01) |
| H01M 10/44 | (2006.01) |
| H01M 10/052 | (2010.01) |
| H01M 10/0562 | (2010.01) |

(52) U.S. Cl.
CPC ......... *B60L 11/1851* (2013.01); *B60L 11/1809* (2013.01); *H01M 10/0481* (2013.01); *H01M 10/445* (2013.01); *H01M 10/052* (2013.01); *H01M 10/0562* (2013.01); *H01M 10/0565* (2013.01); *H01M 2220/20* (2013.01); *Y02T 10/7005* (2013.01)

(58) Field of Classification Search
None
See application file for complete search history.

(56) References Cited

U.S. PATENT DOCUMENTS

2013/0330577 A1* 12/2013 Kristofek .............. H01M 10/48
429/50

FOREIGN PATENT DOCUMENTS

| EP | 1 071 151 A1 | 1/2001 |
| JP | A-2001-35523 | 2/2001 |
| JP | A-2001-511592 | 8/2001 |
| JP | A-2004-213902 | 7/2004 |
| JP | A-2008-147010 | 6/2008 |
| JP | A-2010-9989 | 1/2010 |
| JP | A-2010-56070 | 3/2010 |
| JP | A-2013-45556 | 3/2013 |
| WO | 99/05746 A1 | 2/1999 |
| WO | WO 99/05743 A1 | 2/1999 |

* cited by examiner

*Primary Examiner* — Thomas Tarcza
*Assistant Examiner* — Garrett Evans
(74) *Attorney, Agent, or Firm* — Oliff PLC (57) ABSTRACT

An objective of the present invention is to provide a charging system, capable of increasing the rapid charging capacity of an on-vehicle all-solid-state battery, and reducing the effect of confining pressure on the all-solid-state battery. This is achieved by a charging system for an all-solid-state battery to be mounted in a vehicle, the charging system comprising: a charging section that charges an all-solid-state battery, a pressing section that applies confining pressure to the all-solid-state battery, and a pressure control section that controls the confining pressure, wherein the pressure control section directs the pressing section so that the confining pressure during charging is higher than the confining pressure during discharging.

19 Claims, 5 Drawing Sheets

CHARGING SYSTEM FOR ALL-SOLID-STATE BATTERY

TECHNICAL FIELD

The present invention relates to a charging system for an on-vehicle all-solid-state battery.

BACKGROUND ART

In recent years, secondary batteries have become important components that are essential as power sources for personal computers, video cameras, cellular phones and the like, or as power sources for automobiles and electric power storage.

Among secondary batteries, lithium ion secondary batteries in particular have the feature of higher capacity density than other secondary batteries, and the ability to operate at higher voltage. They are therefore used in data-related devices and communication devices as secondary batteries that are suitable for size and weight reduction, and development has been progressing in recent years toward lithium ion secondary batteries with high output and high capacity, for electric vehicles or hybrid vehicles that constitute lower public hazards.

Lithium ion secondary batteries or lithium secondary batteries comprise a positive electrode layer and negative electrode layer, with an electrolyte comprising a lithium salt situated between them, where the electrolyte is composed of a nonaqueous liquid or solid. When a nonaqueous liquid electrolyte is used as the electrolyte, the electrolyte solution permeates into the positive electrode layer, readily forming an interface between the positive electrode active material of the positive electrode layer and the electrolyte, so that performance is easily improved. However, since the electrolyte solutions that are in wide use are combustible, it becomes necessary to install safety equipment to minimize temperature increase during short circuiting, or to mount a system for ensuring safety, such as preventing short circuiting. On the other hand, all-solid-state batteries, wherein the liquid electrolyte is replaced with a solid electrolyte to render the entire battery solid, do not employ combustible organic solvents in the batteries, and thus allow safety equipment to be simplified and are considered to be superior in terms of production cost and productivity, and their development is also progressing.

Since the adhesiveness of the positive electrode layer, solid electrolyte layer and negative electrode layer in an all-solid-state battery significantly affects the properties of the battery, such as the energy density, capacity, current density and cycle characteristics, technologies have been proposed whereby confining pressure is applied usually in the direction perpendicular to the stacking surface of the all-solid-state battery, so that adhesiveness of the positive electrode layer, solid electrolyte layer and negative electrode layer is maintained even when deformation or expansion takes place in the all-solid-state battery.

Even in secondary batteries wherein multiple all-solid-state batteries are stacked and electrically connected, the adhesiveness between the multiple all-solid-state batteries often significantly affects the electrical connection between the all-solid-state batteries, and therefore the multiple all-solid-state batteries have confining pressure applied in the direction perpendicular to the stacking surface.

In PTLs 1 to 7 there are described techniques for applying confining pressure to batteries in this manner. For example, PTL 1 discloses a secondary battery with an outer shape having opposing flat surfaces, the opposing flat surfaces being pressed in the charge-discharge state, and a weaker pressure being applied in the non-charge-discharge state than in the charge-discharge state of the secondary battery.

CITATION LIST

Patent Literature

[PTL 1] Japanese Unexamined Patent Publication No. 2010-9989
[PTL 2] Japanese Unexamined Patent Publication No. 2001-35523
[PTL 3] Japanese Unexamined Patent Publication No. 2013-45556
[PTL 4] Japanese Unexamined Patent Publication No. 2010-56070
[PTL 5] Japanese Patent Public Inspection No. 2001-511592
[PTL 6] Japanese Unexamined Patent Publication No. 2004-213902
[PTL 7] Japanese Unexamined Patent Publication No. 2008-147010

SUMMARY OF THE INVENTION

Problems to be Solved by the Invention

As mentioned above, all-solid-state batteries are highly safe since they do not use combustible organic solvents, and they are especially promising as on-vehicle secondary batteries, but their low rapid charging performance has been an issue. In addition, when high confining pressure is continuously applied to an all-solid-state battery, this can result in short circuiting between the positive electrode and negative electrode. However, the confining pressure and the charge-discharge characteristic of an all-solid-state battery have been considered to be proportional, and it has been particularly difficult to both increase the rapid charging capacity of an all-solid-state battery while minimizing short-circuiting between the positive electrode and negative electrode.

A demand therefore exists for a charging system for an all-solid-state battery, capable of exhibiting both high rapid charging capacity for on-vehicle all-solid-state batteries, and low effect of confining pressure on all-solid-state batteries.

Means for Solving the Problems

The present inventors have conducted much diligent research in light of this problem, and have discovered a charging system for an on-vehicle all-solid-state battery wherein the confining pressure during charging is higher than the confining pressure during discharging.

The present invention relates to a charging system for an all-solid-state battery to be mounted in a vehicle, the charging system comprising:

a charging section that charges an all-solid-state battery, a pressing section that applies confining pressure to the all-solid-state battery, and a pressure control section that controls the confining pressure, wherein the pressure control section directs the pressing section so that the confining pressure during charging is higher than the confining pressure during discharging.

The invention further relates to a charging system for an all-solid-state battery to be mounted in a vehicle, the charging system comprising:

a charging section that charges an all-solid-state battery, a pressing section that applies confining pressure to the all-solid-state battery, and a pressure control section that controls the confining pressure, wherein the pressure control section comprises a communicator situated at the exterior of the vehicle, for transmission of a signal relating to the confining pressure of the all-solid-state battery, to an exterior charging under pressure device that is capable of applying a higher confining pressure than the pressing section.

Effect of the Invention

With the charging system, of the invention, it is possible to increase the rapid charging capacity of an on-vehicle all-solid-state battery, and to reduce the effect of confining pressure on the all-solid-state battery.

DESCRIPTION OF EMBODIMENTS

Upon conducting diligent research on a charging system for an all-solid-state battery that can both increase the rapid charging capacity for an on-vehicle all-solid-state battery and reduce the effect of confining pressure on the all-solid-state battery, the present inventors have found that although the rapid charging capacity of an all-solid-state battery is more greatly improved with higher confining pressure, the internal resistance that affects the output characteristics during discharging varies little by the confining pressure.

As mentioned above, it has been found that while a higher confining pressure significantly improves the rapid charging capacity of an all-solid-state battery, the internal resistance of an all-solid-state battery has low dependency on the confining pressure, and therefore the confining pressure during discharging can be reduced to lower than the confining pressure during charging. It is possible to alleviate stress on an all-solid-state battery and to minimize short circuiting between the positive electrode and negative electrode, compared to the prior art, by setting the confining pressure during discharging to be lower than the confining pressure during charging, instead of continuing to apply high confining pressure during charge-discharge of the all-solid-state battery.

First Embodiment of the Invention

The first embodiment of the invention is a charging system for an all-solid-state battery to be mounted in a vehicle, the charging system comprising a charging section that charges an all-solid-state battery, a pressing section that applies confining pressure to the all-solid-state battery, and a pressure control section that controls the confining pressure, wherein the pressure control section directs the pressing section so that the confining pressure during charging is higher than the confining pressure during discharging.

Figure 1:
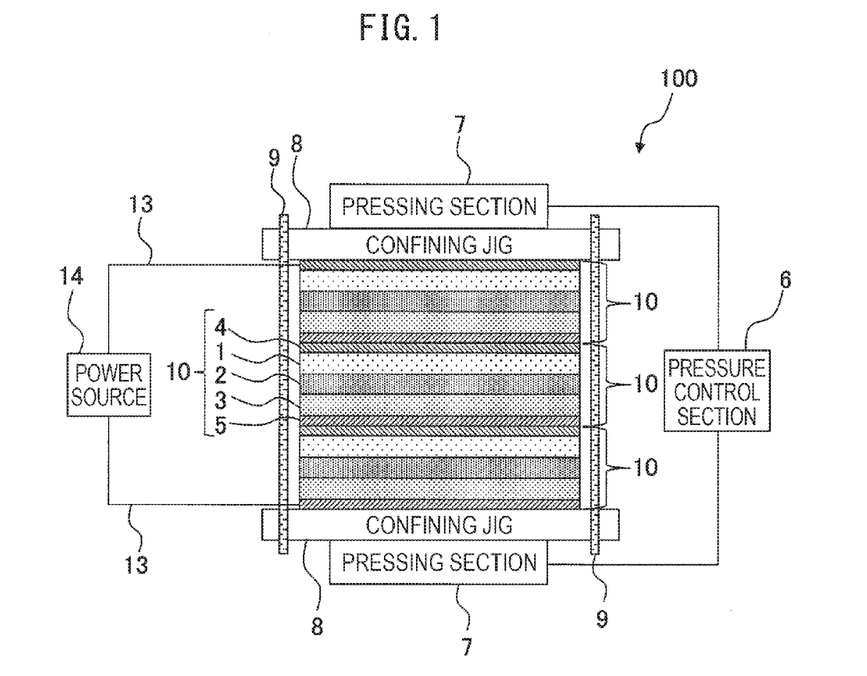
FIG. 1 is a cross-sectional schematic drawing of a charging system for all-solid-state batteries according to a first embodiment of the invention.

FIG. 1 shows a cross-sectional schematic view of a charging system 100 according to the first embodiment of the invention. The charging system 100 comprises a charging section 13 that can charge an all-solid-state battery 10, a pressing section 7 that applies confining pressure to the all-solid-state battery 10, and a pressure control section 6 that controls the confining pressure. The pressure control section 6 directs the pressing section 7 so that the confining pressure during charging is higher than the confining pressure during discharging.

The charging system 100 allows charging and discharging of one or a plurality of all-solid-state batteries 10 while pressing with a prescribed, confining force. In the charging system 100 illustrated in FIG. 1, three all-solid-state batteries 10 are configured in series. Each all-solid-state battery 10 has a positive electrode layer 1, a solid electrolyte layer 2, a negative electrode layer 3, a positive electrode collector 4 and a negative electrode collector 5.

In the charging system 100, the one or more all-solid-state batteries 10 (hereunder also referred to as "all-solid-state battery 10") are situated in series between confining jigs 8 positioned at both ends, allowing a prescribed confining pressure to be applied. The pressing section 7 can press the all-solid-state battery 10 through the confining jig 8, based on directions from the pressure control section 6. The pressing section 7 may also comprise the confining jig 8 in an integral manner. Also, an elastic body, such as a spring, may be situated between the pressing section 7 and the confining jig 8.

The confining jigs 8 are not particularly restricted so long as they are rigid and capable of confining the all-solid-state battery, and they may consist of metal sheets, for example.

The confining jigs 8 positioned on both ends may be linked by an elastic body, such as a spring. When the confining jigs 8 positioned on both ends are linked by a tension spring, it is possible to apply confining pressure to the all-solid-state batteries 10 from the confining jigs 8 to a degree allowing the all-solid-state batteries 10 to be anchored within the confining jigs 8, even when no confining pressure is being applied from the pressing section 7. This will allow the battery pack containing the all-solid-state batteries 10 to be easily removed from the vehicle when the all-solid-state batteries 10 are to be charged, under pressure by using an exterior charging under pressure device as described below.

The charging system 100 may also comprise guide shafts 9. The guide shafts 9 may be situated surrounding the all-solid-state batteries 10, lying in the direction perpendicular to the stacking surface of the all-solid-state batteries 10. This can help to anchor the direction of operation of the confining jigs 8 positioned on both ends or the pressing section 7 comprising the confining jigs 8 to a fixed direction along the guide shafts 9 which are passed through the confining jigs 6 or the confining jigs 8 that are integrally included in the pressing section 7.

The charging section 13 can supply electric power to the all-solid-state batteries 10 for rapid charging of the all-solid-state batteries 10, and it is not particularly restricted so long as it has a conductor wire connecting from an electric power source 14 to the all-solid-state batteries 10. The electric power of the electric power source 14 includes electric power generated by regenerative braking of a vehicle, and optionally it includes commonly employed electric power obtained from an EV charger or commonly employed household electric power.

Throughout the present specification, "rapid charging" means a charge rate of 1 C or greater, and while the upper limit for the charge rate is not particularly restricted, it may be 25 C or less, for example.

The charging section 13 is preferably one that can perform charging while controlling the charge current value and charge final, voltage, and that can perform constant current/constant voltage charging.

More preferably, the charging section 13 has switching means that performs ON/OFF switching of electrical connection with the all-solid-state batteries, control means that controls the OH/OFF state of the switching means, constant current charging means that performs constant current charging of the all-solid-state batteries by flowing a charging current of a prescribed level into the all-solid-state batteries until the all-solid-state batteries reach a prescribed voltage value, and constant voltage charging means that performs constant voltage charging of the all-solid-state batteries after the all-solid-state batteries reaches the prescribed voltage value by the constant current charging means, by flowing into the all-solid-state batteries a charging current with a gradually decreasing current value, so that the all-solid-state batteries are kept at the prescribed voltage value. When the current value of the charging current flowing to the all-solid-state batteries by the constant voltage charging means reduces and falls to a prescribed value, the control means switches the switching means OFF.

The pressure control section 6 judges whether the all-solid-state batteries 10 are in a state of discharging or not and/or whether the all-solid-state batteries 10 are in a state of charging or not, and based on the judgement, directs the pressing section 7 to press the all-solid-state batteries 10 with a prescribed confining pressure. More specifically, the pressure control section 6 directs the pressing section 7 so as to press the all-solid-state batteries 10 at a higher confining pressure during charging than during discharging.

If the pressure control section 6 judges that the all-solid-state batteries 10 is being charged, it may direct the pressing section 7 to confine the all-solid-state batteries 10 with a higher confining pressure than during discharging, or if it judges that the all-solid-state batteries 10 is being discharged, it may direct the pressing section 7 to confine the all-solid-state batteries 10 with a lower confining pressure than during charging, or both of these directions may be sent.

Judgment of the presence or absence of discharging and/or the presence or absence of charging of the all-solid-state batteries 10 by the pressure control section 6 can be made, for example, by current detection means that detects the discharge current and/or charging current of the all-solid-state batteries.

The pressing section 7 is able to apply the prescribed confining pressure to the all-solid-state batteries 10 in the direction perpendicular to the stacking surface, based on the direction from the pressure control section 6.

The pressing section 7 is not particularly restricted so long as it has a construction allowing it to press the all-solid-state batteries 10 with a prescribed confining pressure, and for example, it may be composed of any desired means, such as a spring system, oil pressure system or a combination thereof.

The lower limit for the confining pressure to be applied to the all-solid-state batteries 10 by the pressing section 7 during discharging is preferably 0.01 MPa or greater, more preferably 0.1 MPa or greater and even more preferably 1 MPa or greater, and the upper limit for the confining pressure to be applied to the all-solid-state batteries 10 by the pressing section 7 during discharging is preferably no greater than 100 MPa, more preferably no greater than 50 MPa and even more preferably no greater than 10 MPa.

The confining pressure during charging is greater than the confining pressure during discharging, and is preferably at least 1 MPa greater, more preferably at least 10 MPa greater and even more preferably at least 40 MPa greater than the confining pressure during discharging.

The upper limit fox the confining pressure during charging is preferably no greater than 200 MPa, more preferably no greater than 100 MPa and even more preferably no greater than 50 MPa.

It is possible to further increase the rapid charging performance and to further minimize short circuiting between the positive electrode layer 1 and the negative electrode layer 3 by pressing the all-solid-state batteries 10 during charging and during discharging with such a confining pressure.

The all-solid-state batteries 10 that can be charged by the charging system 100 of the invention may also be in a dormant state essentially without charging and discharging. The confining pressure during dormancy is preferably the same as the confining pressure during discharge, but the confining pressure force during charging or during discharging prior to the dormant state may be continued.

The charging system 100 of the invention may further comprise a communicator for transmission of a signal relating to the confining pressure of the all-solid-state battery, to an exterior charging under pressure device situated at the exterior of the vehicle and capable of applying higher confining pressure than the pressing section 7.

If the charging system 100 of the invention has such a communicator, it will be possible to send a signal-relating to the confining pressure of the all-solid-state battery to an exterior charging under pressure device at the exterior of a vehicle, such as a charging stand. It is possible to perform charging the all-solid-state battery while the exterior charging under pressure device is pressing the battery with a prescribed confining pressure based on the transmitted signal.

The charge capacity of an all-solid-state battery during vehicle running may be reduced if charging of the battery is carried out using the exterior charging under pressure device. This makes it possible to reduce the size of the pressing section 7 in the charging system 100 of the invention, and then to carry out rapid charging of the all-solid-state battery while increasing the volumetric efficiency of the charging system 100 of the invention. By using an exterior charging under pressure device, it is possible to press an all-solid-state battery with a greater applied pressure than the pressure that can be applied inside the vehicle, thereby allowing the rapid charging capacity to be further increased. In addition, by charging an all-solid-state battery while continuously pressing it with a high confining pressure in an exterior charging under pressure device, such as a charging stand, it is possible to perform more highly efficient quick charging than by charging by regenerative braking during vehicle running.

The communicator is not particularly restricted so long as it can send a signal relating to the confining pressure of the all-solid-state battery to the exterior charging under pressure device at the exterior of the vehicle.

The exterior charging under pressure device is not particularly restricted so long as it is one that can perform rapid charge of the all-solid-state batteries 10 at a rate of 1 C or greater, while it is pressing the batteries 10 with a confining pressure that is equal to or greater than that of the pressing section 7 in the charging system 100 of the invention, based on the signal sent from the pressure control section 6 of the charging system 100.

In order to perform charging under pressure of all-solid-state batteries with an exterior charging under pressure device, the all-solid-state batteries 10 mounted in the vehicle may be removed and the all-solid-state batteries 10 may be set in the exterior charging under pressure device so as to allow charging under pressure with the exterior charging under pressure device.

Figure 2:
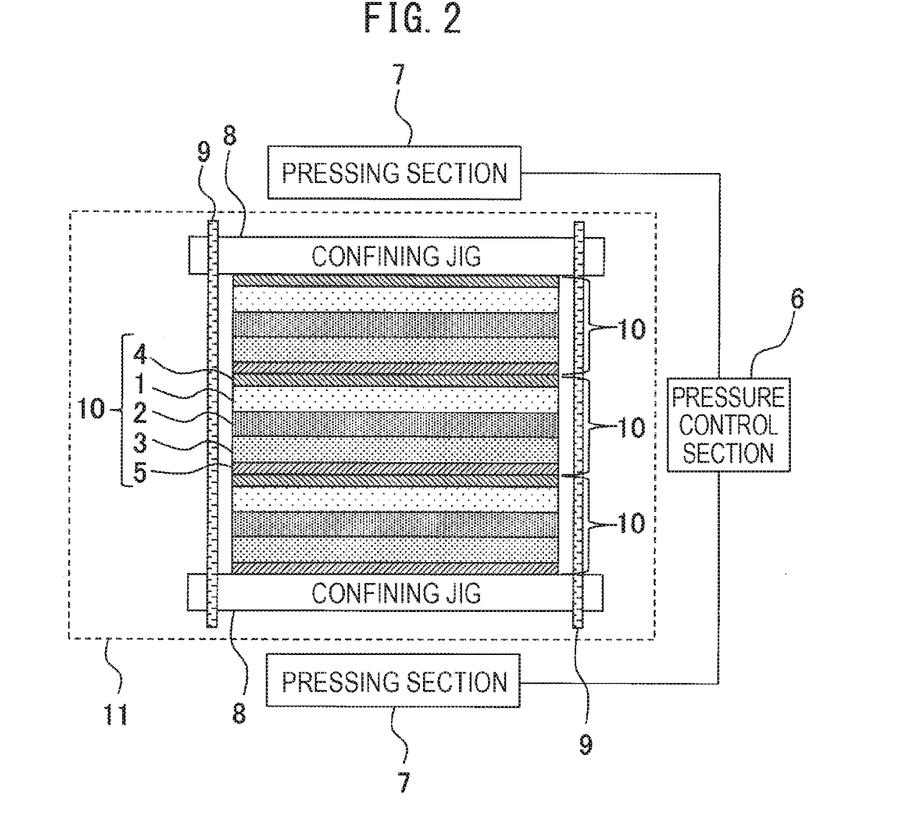
FIG. 2 is a cross-sectional view schematically showing an embodiment of removing a battery pack comprising all-solid-state batteries to be mounted in a vehicle.

FIG. 2 is a cross-sectional view schematically showing an example of an embodiment of removing a battery pack 11 comprising all-solid-state batteries 10 to be mounted in a vehicle. The battery pack 11 comprises one or a plurality of all-solid-state batteries 10, and may further comprise confining jigs 8 with guide shafts 9 running through. The battery pack 11 comprising the all-solid-state batteries 10, confining jigs 8 and guide shafts 9 shown in FIG. 2 may be removed from the vehicle, and the battery pack 11 may be installed in the exterior charging under pressure device so that the all-solid-state batteries 10 can be charged under pressure by the exterior charging under pressure device.

Figure 3:
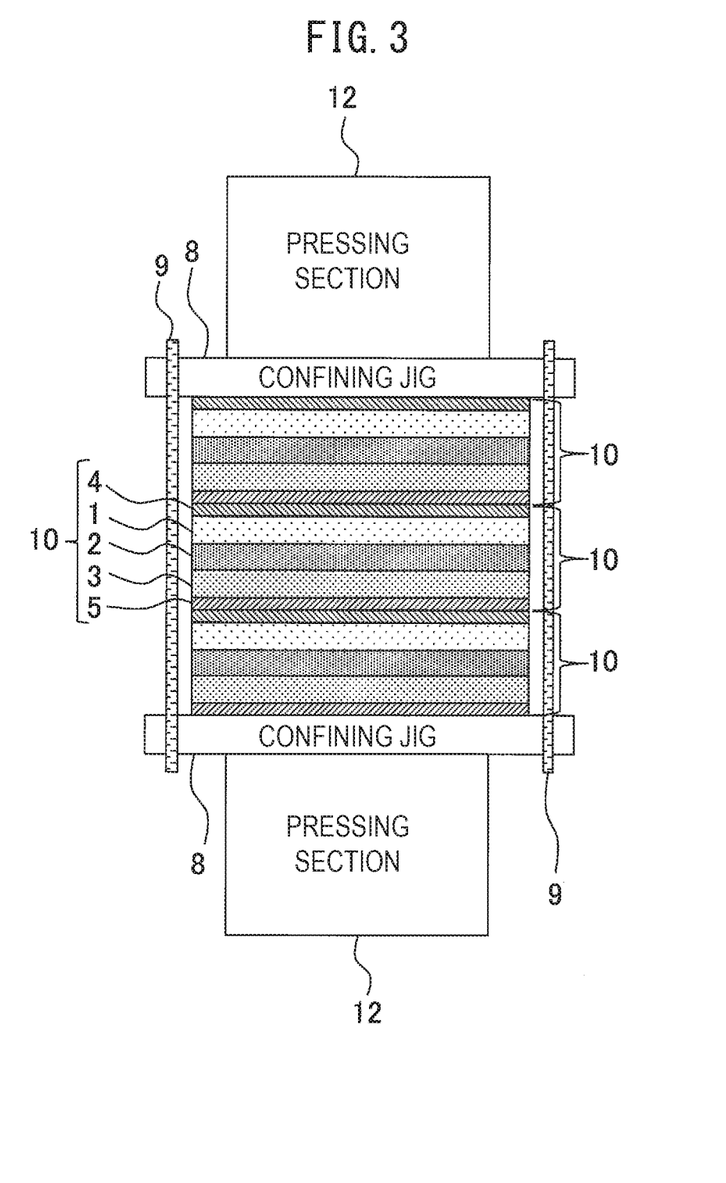
FIG. 3 is a cross-sectional view schematically showing an embodiment of charging all-solid-state batteries under pressure with an exterior charging under pressure device.

FIG. 3 is a cross-sectional view schematically showing an example of an embodiment of charging all-solid-state batteries 10 under pressure with an exterior charging under pressure device. The battery pack comprising the all-solid-state batteries 10, confining jigs 8 and guide shafts 9 may be set so as to allow charging under pressure with the pressing section 12 of the exterior charging under pressure device, and the all-solid-state batteries 10 can be rapid charged while pressing with the prescribed confining pressure through the confining jigs 8.

If the vehicle in which the charging system 100 of the invention is mounted is caught in traffic, the difference in confining pressure between charging and discharging may be reduced compared to the difference in confining pressure between charging and discharging when the vehicle is running normally (hereunder referred to as "normal mode"), or the difference in confining pressure between charging and discharging may be reduced to zero.

In the charging system 100 of the invention, since the confining pressure of the all-solid-state batteries 10 is varied between charging and discharging, and the vehicle undergoes repeated acceleration and deceleration for short periods when traffic becomes congested while the vehicle is running, switching between charging and discharging of the all-solid-state batteries is repeated for short periods and the confining pressure of the all-solid-state battery varies for short periods. When the confining pressure of an all-solid-state battery varies frequently within short periods, this may render the all-solid-state battery prone to short circuiting between the positive electrode and negative electrode rather than preventing short circuiting.

Therefore, when the switching time between charging and discharging is within a prescribed time period, it is preferred for the difference in confining pressure between charging and discharging to be reduced, or for the difference in confining pressure between charging and discharging to be zero.

Throughout the present specification, "traffic congestion" refers to a condition where vehicle speed is preferably no faster than 20 km/hr and more preferably no faster than 10 km/hr, continuously for a prescribed time period, such as 10 minutes. The pressure control section 6 can monitor the vehicle speed and judge whether there is a condition of traffic congestion.

For example, the confining pressure during discharging when the vehicle is caught in traffic congestion may be greater than the confining pressure during discharging in normal mode. Alternatively, the confining pressure during discharging may be the same as the confining pressure during charging, without lowering the confining pressure during discharging when the vehicle is caught in traffic congestion.

Conversely, the confining pressure during charging when the vehicle is caught in traffic congestion may be reduced to be lower than the confining pressure during charging in normal mode. Alternatively, the confining pressure during charging may be the same as the confining pressure during discharging, without increasing the confining pressure during charging when the vehicle is caught in traffic congestion.

Preferably, the confining pressure during discharging is the same as the confining pressure during charging, without reducing the confining pressure during discharging when the vehicle is caught in traffic congestion.

By thus controlling the confining pressure, it is possible to increase the rapid charging capacity of the all-solid-state battery while minimizing short circuiting between the positive electrode and negative electrode, even when the vehicle is caught in traffic congestion.

In the charging system 100 of the invention, if the switching time between charging and discharging is shortened to within a prescribed time period, the difference in confining pressure between charging and discharging may be reduced compared to the difference in confining pressure between charging and discharging when the vehicle is running normally (hereunder referred to as "normal mode"), or the difference in confining pressure between charging and discharging may be zero.

More preferably, when the switching time between charging and discharging is within 10 seconds as the average for a prescribed time, such as 5 minutes, the difference in confining pressure between charging and discharging may be reduced compared to the difference in confining pressure between charging and discharging in normal mode, or it may be zero, as described above.

Throughout the present specification, the switching time between charging and discharging refers to the time for one cycle of charging, discharging and charging, or discharging, charging and discharging, of an all-solid-state battery. The pressure control section 6 can measure the switching time between charging and discharging.

The charging system 100 of the invention may further comprise a communicator in communication with a traffic congestion prediction system. If a condition of traffic congestion is predicted by the traffic congestion prediction system, the difference in confining pressure between charging and discharging can be reduced compared to the difference in confining pressure between charging and discharging in normal mode, or it can be reduced to zero. The traffic congestion prediction system is not particularly restricted, and for example, it may be a system, such as the Vehicle Information and Communication System (VICS®).

Figure 4:
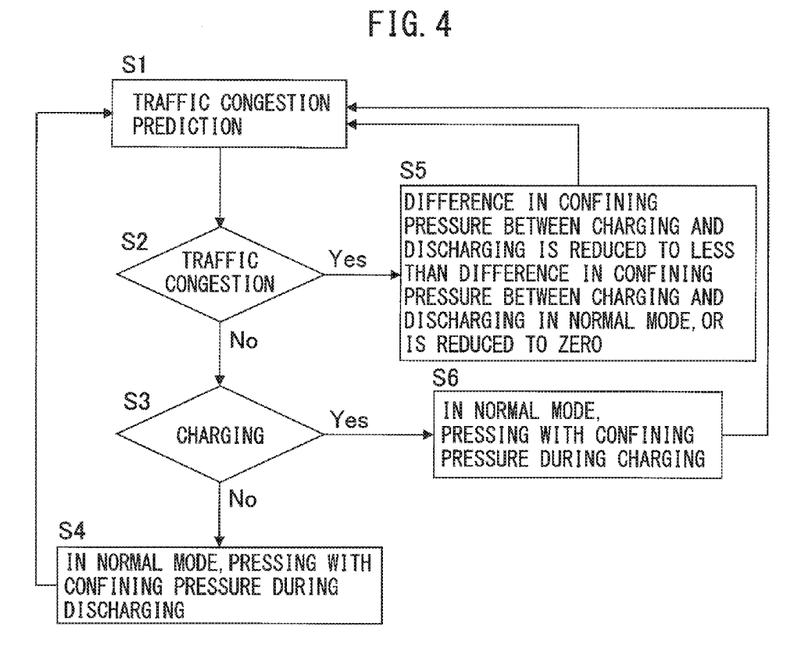
FIG. 4 is a flow chart representing the flow in a control method where the charging system of the invention has a communicator in communication with a traffic congestion prediction system.

FIG. 4 is a flow chart representing an example of flow in a control method where the charging system of the invention has a communicator in communication with a traffic congestion prediction system. In step S1, traffic congestion information is received from a traffic congestion prediction system. In step S2, the existence of a state of traffic congestion is discerned. If it is discerned that there is no state of traffic congestion, it will be discerned in step S3 whether the all-solidstate battery is being charged. If it is discerned that it is being charged, in step S6 the all-solid-state battery will be pressed with the prescribed confining pressure for charging in normal mode. If it is discerned in step S3 that it is not being charged, in step S4 the confining pressure of the all-solid-state battery will be increased to be greater than the confining pressure during discharging, in normal mode. If it is discerned in step S2 that there is a state of traffic congestion, in step S5 the difference in confining pressure during charging and discharging will be reduced to be less than the difference in confining pressure during charging and discharging in normal mode, or it is reduced to zero. Following steps S4, S5 and S6, the flow is returned to step S1. If no traffic congestion prediction information is received in step S1, the flow may proceed from step S1 to step S3, for discernment of whether the battery is being charged.

If the traffic congestion prediction system predicts traffic congestion, the difference in confining pressure between charging and discharging may foe reduced to be lower than the difference in confining pressure between charging and discharging in normal mode, or it may be reduced to zero, starting 5 minutes, 10 minutes or 15 minutes before entering the area of traffic congestion, for example.

Second Embodiment of the Invention

The second embodiment of the invention is a charging system for an all-solid-state battery to be mounted in a vehicle, the charging system comprising:

a charging section that charges an all-solid-state battery, a pressing section that applies confining pressure to the all-solid-state battery, and a pressure control section that controls the confining pressure, wherein the pressure control section comprises a communicator situated at the exterior of the vehicle, for transmission of a signal relating to the confining pressure of the all-solid-state battery, to an exterior charging under pressure device that is capable of applying a higher confining pressure than the pressing section.

According to the second embodiment of the invention, the communicator can send a signal relating to the confining pressure of the all-solid-state battery, to an exterior charging under pressure device at the exterior of a vehicle, such as a charging stand. Therefore, it is possible to perform charging of the all-solid-state battery while the exterior charging under pressure device is pressing the battery with a prescribed confining pressure based on the transmitted signal.

According to the second embodiment of the invention, charging of the all-solid-state battery can be performed by using an exterior charging under pressure device. Therefore, it is possible for the confining force during charging to be the same as the confining pressure during discharging when the vehicle is running, and thereby it is also possible to reduce the size of the pressing section in the charging system of the invention compared to that of the first embodiment of the invention, and to further improve the volumetric efficiency of the charging system of the invention. Furthermore, by using an exterior charging under pressure device, it is possible to press an all-solid-state battery with a greater applied pressure than the pressure that can be applied inside the vehicle, thereby allowing the rapid charging capacity to be further increased. By charging an all-solid-state battery while continuously pressing it with a higher confining pressure in an exterior charging under pressure device, such as a charging stand, if is possible to perform more highly efficient rapid charging than by charging by regenerative braking during vehicle running.

The exterior charging under pressure device is not particularly restricted so long as it is one that can perform rapid charging of the all-solid-state batteries, while it is pressing the battery with a confining pressure that is greater than that of the pressing section in the charging system of the invention, based on the signal sent from the pressure control section of the charging system of the invention.

The rest of the features of the exterior charging under pressure device, and the method for removing the battery pack for charging under pressure of the all-solid-state battery with the exterior charging under pressure device, are the same as described for the first embodiment.

The charging system 100 of the invention may be mounted in a vehicle, for example, a plug-in hybrid vehicle (PHV), electric vehicle (EV) or hybrid vehicle (HV).

As shown in FIG. 1, the all-solid-state batteries 10 that can be charged with the charging system 100 of the invention may each comprise a positive electrode layer 1, a solid electrolyte layer 2 and a negative electrode layer 3.

The solid electrolyte material included in the solid electrolyte layer 2 may be a material that can be utilized as a solid electrolyte for all-solid-state batteries. Examples of the solid electrolyte materials include sulfide-based amorphous solid electrolytes, such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and $Li_2S$—$P_2S_5$, oxide-based amorphous solid electrolytes, such as $Li_2O$—$B_2O_3$—$P_2O_5$, $Li_2O$—$SiO_2$, $Li_2O$—$B_2O_3$ and $Li_2O$—$B_2O_3$—$ZnO$, crystalline oxides, such as $Li_{1.3}Al_{0.3}Ti_{0.7}(PO_4)_3$, $Li_{1+x+y}A_xTi_{2-x}Si_yP_{3-y}O_{12}$ (A is Al or Ga, $0 \leq x \leq 0.4$, $0 < y \leq 0.6$), $[(B_{1/2}Li_{1/2})_{1-z}C_z]TiO_3$ (B is La, Pr, Nd or Sm, C is Sr or Ba, $0 \leq z \leq 0.5$), $Li_5La_3Ta_2O_{12}$, $Li_2La_3Zr_2O_{12}$, $Li_6BaLa_2Ta_2O_{12}$ and $Li_{0.6}Si_{0.6}P_{0.4}O_4$, crystalline oxynitrides, such as $Li_3PO_{(4-3/2w)}N_2$ (w<1), and $LiI$, $LiI$—$Al_2O_3$, $Li_3N$, $Li_3N$—$LiT$—$LiOH$ and the like. Sulfide-based amorphous solid electrolytes are preferably used from the viewpoint of their excellent lithium ion conductivity. The solid electrolyte used for the invention may be a semi-solid polymer electrolyte, such as polyethylene oxide, polypropylene oxide, polyvinylidene fluoride or polyacrylonitrile, containing a lithium salt.

The charging system of the invention is particularly suitable for charging of an all-solid-state battery wherein the solid electrolyte material in the solid electrolyte layer is a sulfide-based amorphous solid electrolyte.

The active material used in the positive electrode layer 1 and negative electrode layer 3 may be a material that can be utilized as an electrode active material for all-solid-state batteries. Examples of the active materials include lithium cobalt oxide ($LiCoO_2$), lithium nickel oxide ($LiHiO_2$), lithium manganese oxide ($LiMn_2O_4$), $LiCo_{1/3}Ni_{1/3}N_{1/3}O_2$, hetero-element-substituted Li—Mn spinel having a composition represented by $Li_{1+x}Mn_{2-x-y}M_yO_4$ (where M is one or more metal elements selected from among Al, Mg, Co, Fe, Ni and Zn), lithium titanate ($Li_xTiO_y$), lithium metal, phosphates ($LiMPO_4$, where M is Fe, Mn, Co or Ni), transition metal oxides, such as vanadium oxide ($V_2O_5$) and molybdenum oxide ($MoO_3$), titanium sulfide ($TiS_2$), carbon materials, such as graphite and hard carbon, lithium cobalt nitride (LiCoN), lithium silicon oxides ($Li_xSi_yO_z$), lithium metal (Li), lithium alloys (LiM, where M is Sn, Si, Al, Ge, Sb or P), lithium storage intermetallic compounds ($Mg_xM$ or $N_ySb$, where M is Sn, Ge or Sb, and K is in, Cu or Mn), and derivatives thereof.

In the invention, there is no clear distinction between positive electrode active materials and negative electrode active materials, and a battery with the desired voltage can be constructed by comparing the two different charge-discharge potentials and using the one exhibiting an electropositive charge-discharge potential as the positive electrode and the one exhibiting an electronegative potential as the negative electrode.

The positive electrode layer 1 may optionally include a solid electrolyte known to be usable in all-solid-state batteries. Examples of such solid electrolytes include the aforementioned solid electrolytes that may be included in the solid electrolyte layer 2. When the positive electrode layer 1 comprises a solid electrolyte, the blending ratio of the positive electrode active material and the solid electrolyte is not particularly restricted but the positive electrode active material: solid electrolyte volume ratio is preferably 40:60 to 90:10.

When the positive electrode layer 1 contains a sulfide solid electrolyte, the positive electrode active material is preferably covered with an ionic conductive oxide, from the viewpoint of inhibiting formation of a high resistance layer at the interface between the positive electrode active material and the sulfide solid electrolyte, to help prevent increase in battery resistance. Examples of lithium ion conducting oxides to cover the positive electrode active material include oxides represented by the general formula $Li_xAO_y$ (where A is B, C, Al, Si, P, S, Ti, Zr, Nb, Mo, Ta or W, and x and y are positive integers). Specific examples of the lithium ion conducting oxides include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. The lithium ion conducting oxide may also be a complex oxide.

A complex oxide covering the positive electrode active material may be any combination of the aforementioned lithium ion conducting oxides, examples of which include $Li_4SiO_4$—$Li_3BO_3$ and $Li_4SiO_4$—$Li_3PO_4$.

When the surface of the positive electrode active material is covered with an ionic conductive oxide, it is sufficient if the ionic conductive oxide covers at least part of the positive electrode active material, although it may also cover the entire surface of the positive electrode active material. The thickness of the ionic conductive oxide covering the positive electrode active material is preferably from 0.1 nm to 100 nm, and more preferably from 1 nm to 20 nm, for example. The thickness of the ionic conductive oxide can be measured by using a transmission electron microscope (TEM), for example.

The positive electrode layer 1, solid electrolyte layer 2 and negative electrode layer 3 may each comprise a binder. The binder material is preferably polytetrafluoroethylene, polytrifluoroethylene, polyethylene, nitrite rubber, polybutadiene rubber, butyl rubber, hydrogenated butylene rubber, polystyrene, styrene-butadiene rubber, styrene-butadiene latex, polysulfide rubber, nitrocellulose, acrylonitrile-butadiene rubber, polyvinyl fluoride, polyvinylidene fluoride, fluorine rubber or the like, although there is no limitation to these.

The positive electrode layer 1 and negative electrode layer 3 may optionally comprise conductive aid particles. The conductive aid particles are not particularly restricted and may be graphite, carbon black or the like. The binder is preferably polytetrafluoroethylene, polytrifluoroethyiene, polyethylene, nitride rubber, polybutadiene rubber, butyl rubber, polystyrene, styrene-butadiene rubber, styrene-butadiene latex, polysulfide rubber, nitrocellulose, acrylonitrile-butadiene rubber, polyvinyl fluoride, polyvinylidene fluoride (PVDF), fluorine rubber or the like, with no particular restriction to these.

The material of the positive electrode collector 4 is not particularly restricted so long as it is conductive and has a function as a positive electrode collector, and examples thereof include SUS, aluminum, copper, nickel, iron, titanium and carbon, with SUS and aluminum being preferred. The positive electrode collector 4 may be in the form of, for example, a foil, sheet or mesh, with a foil being preferred.

The material of the negative electrode collector 5 is not particularly restricted so long as it is conductive and has a function as a negative electrode collector, and examples thereof include SUS, copper, nickel and carbon, with SUS and copper being preferred. The negative electrode collector 5 may be in the form of, for example, a foil, sheet or mesh, with a foil being preferred.

The thickness of the positive electrode collector 4 and negative electrode collector 5 is not particularly restricted, and for example, a metal foil with a thickness of about 10 to 500 μm may be used.

For the battery case 6 enclosing the all-solid-state batteries 10 there may be used a laminate film or the like known to be usable for all-solid-state batteries. Examples of such laminate films include resin laminate films, and films obtained by vapor deposition of metals on resin laminate films.

The all-solid-state batteries 10 may have any desired forms, such as cylindrical, rectilinear, button-shaped, coin-shaped or flat-shaped forms, with no limitation to these.

EXAMPLES

Fabrication of All-Solid-State Batteries

An all-solid-state battery for testing was fabricated in a glow box with an Ar atmosphere, in the following manner.

Figure 5:
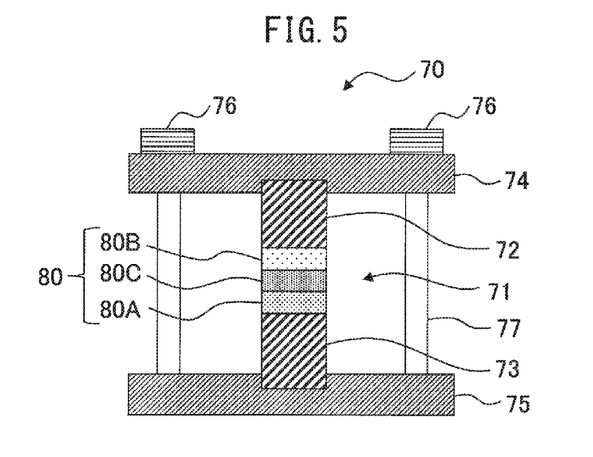
FIG. 5 is a cross-sectional schematic drawing of a miniature cell for testing, used to evaluate a charging system according to the invention.

In butyl butyrate there were dispersed 1700 mg of $LiCo_{1/3}Ni_{1/3}Mn_{1/3}O_2$ positive electrode active material particles, and 33.5 parts by weight of $Li_2S$—$P_2S_5$ as a solid electrolyte, 3 parts by weight of carbon fiber as a conductive agent and 1.5 parts by weight of PVDF as a binder as the solid ratio with respect to 100 parts by weight of the positive electrode active material particles. The dispersing medium was placed in a sample bottle and mixed for 30 seconds using an ultrasonic homogenizer (UH-50, product of SMT CO., LTD), and then mixed for 30 minutes using a shaker (TTM-1 by Sibata Scientific Technology, Ltd.) to obtain a slurry. The slurry was coated onto a 20 μm-thick M foil with a 4 Faces Applicator (product of Taiyu Kizai Co., Ltd.) and dried to obtain a positive electrode composite layer 80A.

There were dispersed in butyl butyrate, 1200 mg of natural graphite-based carbon (product of Mitsubishi Chemical Corp.) as a negative electrode active material, and 73 parts by weight of $Li_2S$—$P_2S$ as a solid electrolyte and 2.5 parts by weight of PVDF as a binder, as solid ratios with respect to 100 parts by weight of the negative electrode active material. The dispersing medium was placed in a sample bottle, mixed for 30 seconds using an ultrasonic homogenizer, and then mixed for 30 minutes using a shaker, to obtain a slurry. The slurry was coated onto a 10 μm-thick Cu foil with a 4 Faces Applicator (product of Taiyu Kizai Co., Ltd.) and dried to obtain a negative electrode composite layer 80B.

There were dispersed in butyl butyrate, 300 mg of a $Li_2S$—$P_2S_5$ solid electrolyte and 1 part by weight of PVDF as a binder, as the solid ratio with respect to 100 parts by weight of the solid electrolyte. The dispersing medium was placed in a sample bottle, mixed for 30 seconds using an ultrasonic homogenizer, and then mixed for 30 minutes using a shaker, to obtain a slurry. The slurry was coated onto a 40 μm-thick Al foil with a 4 Faces Applicator (product of Taiyu Kisai Co., Ltd.) and dried to obtain a solid electrolyte layer 80C on the Al foil.

There was prepared a miniature cell 70 comprising a cylinder 71 with an upper piston 72 and lower piston 73 made of stainless steel, as shown in FIG. 5. FIG. 5 is a cross-sectional schematic drawing of a miniature cell for testing 70, used to evaluate a charging system according to the invention. The miniature cell 70 has a structure comprising a cylinder 71 for accommodating a generating element 80 including a positive electrode composite layer 80A, a solid electrolyte layer 80C and a negative electrode composite layer 80B, and an upper pedestal 74 and lower pedestal 75 made of stainless steel having recesses into which the cylinder 71 is to be fitted, the upper pedestal 74 and lower pedestal 75 being connected by pedestal support rods 77, the upper piston 72 and lower piston 73 being pressable with a prescribed pressure, and the cylinder 71, upper pedestal 74 and lower pedestal 75 being clampable with hexagon headed bolts 76.

The solid electrolyte layer 80C was punched out to 11.28 mm$\phi$ and inserted into the cylinder 71, and then pressed for 5 seconds at 100 MPa. The pressed solid electrolyte layer 80C was then removed from the cylinder 71.

The obtained positive electrode composite layer 80A was punched out to 11.23 mm$\phi$ and placed in the cylinder 71 with the Al foil facing downward, and the pressed solid electrolyte layer 80C was placed with the solid electrolyte layer facing the positive electrode composite layer 80A (with the Al foil facing upward), and pressed at 100 MPa for 5 seconds. The Al foil of the solid electrolyte layer 80C was then stripped off.

The negative electrode composite layer 80B was punched out to 11.28 mm$\phi$ and placed in the cylinder 71 with the negative electrode composite layer facing the solid electrolyte layer (with the Cu foil facing upward), and pressed for 1 minute at 600 MPa.

Figure 6:
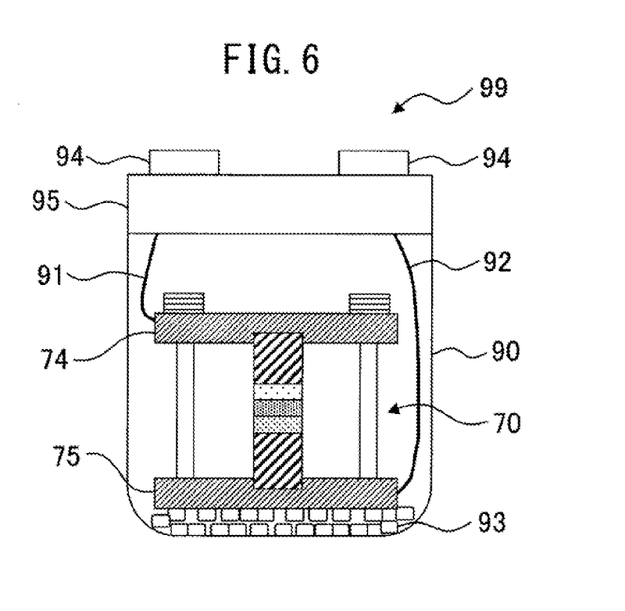
FIG. 6 is a cross-sectional schematic drawing of an all-solid-state battery for testing, comprising a miniature cell for testing used to evaluate a charging system according to the invention.

The upper pedestal 74 and lower pedestal 75 of the miniature cell 70 were then clamped with the hexagon headed bolts 76 to a prescribed torque so as to apply a confining pressure of 45 MPa to the generating element 80, thereby fabricating a miniature cell 70. As shown in FIG. 6, a wire 91 and wire 92 were connected to the upper pedestal 74 and lower pedestal 75, respectively, of the miniature cell 70, placed in a glass cell 90 housing a desiccant 93, and then sealed with an aluminum cover 95 provided with a contact fitting 94 and an O-ring, to fabricate an all-solid-state battery for testing 99. FIG. 6 is a cross-sectional schematic drawing of an all-solid-state battery for testing 99, comprising a miniature cell for testing 70 used to evaluate a charging system according to the invention.

Measurement of Internal Resistance

The all-solid-state battery for testing 99 comprising the miniature cell 70 with a confining pressure of 45 MPa applied to the generating element 80 was allowed to stand for 3 hours in a thermostatic bath at 25° C. before the start of the test. The wire 91 and wire 92 were connected to a charge-discharge evaluator (TOSCAT-3200, product of Toyo System Co., Ltd.). The miniature cell 70 was charged and discharged at 25° C., 1 atmosphere, and it was then charged to 3.9 V by constant current-constant voltage charging (the final current corresponds to 1/100 C). After pausing for 10 minutes, constant current ($\Delta T$) discharge was carried out, and the voltage difference ($\Delta V$) between initial and 10 seconds later was measured, calculating the internal resistance R from the formula: $R=\Delta V/\Delta I$.

Measurement of Chargeable Capacity

The all-solid-state battery for testing 99 with a confining pressure of 45 MPa applied to the generating element 80 was allowed to stand for 3 hours in a thermostatic bath at 25° C. before the start of the test. A charge-discharge evaluator (TOSCAT-3200, product of Toyo System Co., Ltd.) was used for discharging of the all-solid-state battery for testing 99 at 25° C., 1 atmosphere, to 3 V by constant current-constant voltage discharge (the final current corresponds to 1/100 C). After pausing for 10 minutes, 1.5 C constant current charging was carried out, and the capacity which allowed charging without causing a voltage drop of more than 5 mV was measured as the chargeable capacity.

Next, the internal resistance and chargeable capacity of the all-solid-state battery for testing 99 were measured in the same manner, with a confining pressure of 1.5 MPa on the generating element 80.

The chargeable capacity at 1.5 MPa confinement was 70%, based on 100% for the data at 45 MPa confinement (reference). The internal resistance increase at 1.5 MPa confinement was 11%, based on 0% for the data at 45 MPa confinement (reference).

Figure 7:
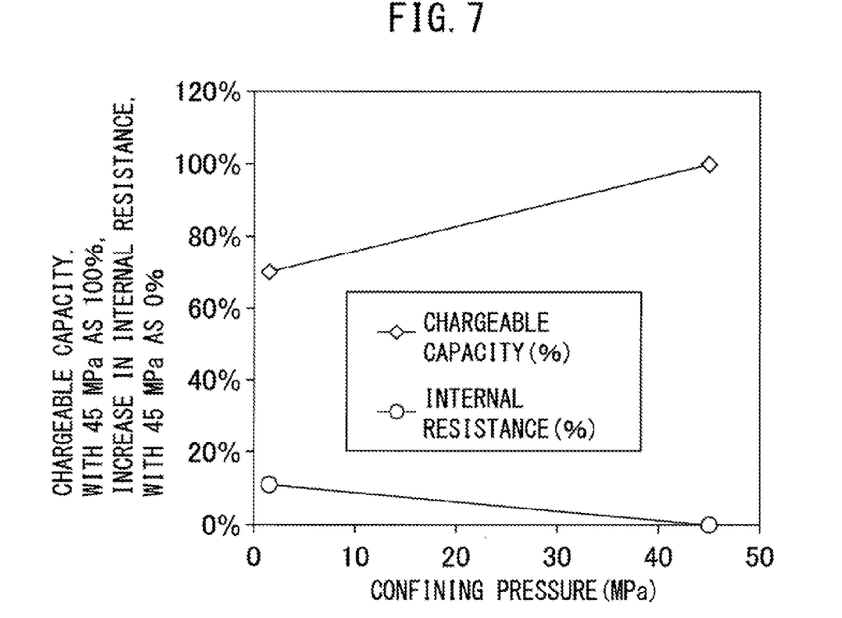
FIG. 7 is a graph showing the chargeable capacity (%) at 1.5 MPa confinement, where the chargeable capacity at 45 MPa confinement is 100% (reference), and the resistance increase (%) at 1.5 MPa confinement, where the resistance at 45 MPa confinement is 0% (reference).

Table 1 and FIG. 7 show the chargeable capacity (%) at 1.5 MPa confinement, where the chargeable capacity at 45 MPa confinement is 100% (reference), and the resistance increase (%) at 1.5 MPa confinement, where the resistance at 45 MPa confinement is 0% (reference).

[Table 1]

TABLE 1

| Confining Pressure (MPa) | Chargeable capacity (%) | Internal resistance increase (%) |
| --- | --- | --- |
| 1.5 | 70 | 11 |
| 45 | 100 | 0 |

As shown in Table 1 and FIG. 7, the rapid charging capacity of the all-solid-state battery was significantly improved with a higher confining pressure, but the dependency of the internal resistance during discharging on the confining pressure was low. Thus, since a higher confining pressure significantly improves the rapid charging capacity of an all-solid-state battery and the internal resistance has low dependency on the confining pressure, the confining pressure during discharging can be reduced to lower than the confining pressure during charging, and the effect of confining pressure on the all-solid-state battery can be reduced. Such a charging system according to the invention allows high rapid charging capacity to be obtained, and can alleviate stress on the all-solid-state battery and minimize short circuiting between the positive electrode and negative electrode, as compared to the prior art.

EXPLANATION OF SYMBOLS

1 Positive electrode layer
2 Solid electrolyte layer
3 Negative electrode layer
4 Positive electrode collector
5 Negative electrode collector
6 Pressure control section
7 Pressing section
8 Confining jig
9 Guide shaft
10 All-solid-state battery
11 Battery pack
12 Pressing section of exterior charging under pressure device
13 Charging section
14 Power source 100 Charging system
70 Miniature cell
71 Cylinder
72 Upper piston
73 Lower piston
74 Upper pedestal.
75 Lower pedestal
76 Hexagon headed bolt
77 Pedestal support rod
80 Generating element
80A Positive electrode composite layer
80B Solid electrolyte layer
80C Negative electrode composite layer
90 Glass cell
91 Wire
92 Wire
93 Desiccant
94 Contact fitting
95 Aluminum cover
99 All-solid-state battery for testing

What is claimed is:

1. A charging system for an all-solid-state battery to be mounted in a vehicle, the charging system comprising:
a charging section that charges the all-solid-state battery,
a pressing section that applies confining pressure to the all-solid-state battery,
a pressure control section that controls the confining pressure applied by the pressing section,
wherein the pressure control section directs the pressing section so that the confining pressure at least some of the time during charging is higher than the confining pressure during discharging, and
a communicator in communication with a traffic congestion prediction system, and when a state of traffic congestion is predicted, a difference in the confining pressure between the charging and the discharging is reduced compared to when the vehicle is running normally.

2. The charging system according to claim 1, wherein, when the state of traffic congestion is predicted, the difference in the confining pressure between the charging and the discharging is reduced to zero.

3. A charging system for an all-solid-state battery to be mounted in a vehicle, the charging system comprising:
a charging section that charges the all-solid-state battery,
a pressing section that applies confining pressure to the all-solid-state battery, and
a pressure control section that controls the confining pressure applied by the pressing section,
wherein the pressure control section comprises a communicator situated at an exterior of the vehicle, for transmission of a signal relating to the confining pressure of the all-solid-state battery, to an exterior charging under pressure device that is capable of applying a higher confining pressure than the confining pressure applied by the pressing section.

4. A charging system for an all-solid-state battery to be mounted in a vehicle, the charging system comprising:
a charging section that charges the all-solid-state battery,
a pressing section that applies confining pressure to the all-solid-state battery, and
a pressure control section that controls the confining pressure applied by the pressing section, wherein
the pressure control section directs the pressing section so that the confining pressure at least some of the time during charging is higher than the confining pressure during discharging, and
the pressure control section further comprises a communicator for transmission of a signal relating to the confining pressure, to an exterior charging under pressure device situated at an exterior of the vehicle and capable of applying higher confining pressure onto the all-solid-state battery than the confining pressure applied by the pressing section.

5. The charging system according to claim 4, wherein a difference in the confining pressure between the charging and the discharging is reduced when the vehicle is caught in traffic congestion, compared to when the vehicle is running normally.

6. The charging system according to claim 5, wherein the communicator communicates with a traffic congestion prediction system, and when a state of traffic congestion is predicted, the difference in the confining pressure between the charging and the discharging is reduced compared to when the vehicle is running normally.

7. The charging system according to claim 5, wherein, when the vehicle is caught in traffic congestion, the difference in the confining pressure between the charging and the discharging is reduced to zero.

8. The charging system according to claim 4, wherein a difference in the confining pressure between the charging and the discharging is reduced when a switching time between the charging and the discharging is within 10 seconds.

9. The charging system according to claim 8, wherein the communicator communicates with a traffic congestion prediction system, and when a state of traffic congestion is predicted, the difference in the confining pressure between the charging and the discharging is reduced compared to when the vehicle is running normally.

10. The charging system according to claim 8, wherein, when the switching time between the charging and the discharging is within 10 seconds, the difference in the confining pressure between the charging and the discharging is reduced to zero.

11. The charging system according to claim 4, wherein the communicator communicates with a traffic congestion prediction system, and when a state of traffic congestion is predicted, a difference in the confining pressure between the charging and the discharging is reduced compared to when the vehicle is running normally.

12. The charging system according to claim 11, wherein, when the state of traffic congestion is predicted, the difference in the confining pressure between the charging and the discharging is reduced to zero.

13. A charging system for an all-solid-state battery to be mounted in a vehicle, the charging system comprising:
a charging section that charges the all-solid-state battery,
a pressing section that applies confining pressure to the all-solid-state battery, and
a pressure control section that controls the confining pressure applied by the pressing section, wherein
the pressure control section directs the pressing section so that the confining pressure at least some of the time during charging is higher than the confining pressure during discharging, and
a difference in the confining pressure between the charging and the discharging is reduced when the vehicle is caught in traffic congestion, compared to when the vehicle is running normally.

14. The charging system according to claim 13, wherein, when the vehicle is caught in traffic congestion, the difference in the confining pressure between the charging and the discharging is reduced to zero.

15. The charging system according to claim 13, further comprising a communicator in communication with a traffic congestion prediction system, and when a state of traffic congestion is predicted, the difference in the confining pressure between the charging and the discharging is reduced compared to when the vehicle is running normally.

16. The charging system according to claim 15, wherein, when the state of traffic congestion is predicted, the difference in the confining pressure between the charging and the discharging is reduced to zero.

17. A charging system for an all-solid-state battery to be mounted in a vehicle, the charging system comprising:
 a charging section that charges the all-solid-state battery,
 a pressing section that applies confining pressure to the all-solid-state battery, and
 a pressure control section that controls the confining pressure applied by the pressing section, wherein
 the pressure control section directs the pressing section so that the confining pressure at least some of the time during charging is higher than the confining pressure during discharging, and
 a difference in the confining pressure between the charging and the discharging is reduced when a switching time between the charging and the discharging is within 10 seconds.

18. The charging system according to claim 17, further comprising a communicator in communication with a traffic congestion prediction system, and when a state of traffic congestion is predicted, the difference in the confining pressure between the charging and the discharging is reduced compared to when the vehicle is running normally.

19. The charging system according to claim 17, wherein, when the switching time between the charging and the discharging is within 10 seconds, the difference in the confining pressure between the charging and the discharging is reduced to zero.

* * * * *